United States Patent
Keohan

(10) Patent No.: US 11,761,421 B2
(45) Date of Patent: Sep. 19, 2023

(54) WIND TURBINE BLADE MANUFACTURE

(71) Applicant: Vestas Wind Systems A/S, Aarhus N. (DK)

(72) Inventor: Sean Keohan, Shanklin (GB)

(73) Assignee: Vestas Wind Systems A/S, Aarhus N (DK)

( * ) Notice: Subject to any disclaimer, the term of this patent is extended or adjusted under 35 U.S.C. 154(b) by 215 days.

(21) Appl. No.: 16/762,205

(22) PCT Filed: Nov. 7, 2018

(86) PCT No.: PCT/DK2018/050286
§ 371 (c)(1),
(2) Date: May 7, 2020

(87) PCT Pub. No.: WO2019/091531
PCT Pub. Date: May 16, 2019

(65) Prior Publication Data
US 2020/0332763 A1      Oct. 22, 2020

(30) Foreign Application Priority Data

Nov. 10, 2017   (DK) .......................... PA 2017 70850

(51) Int. Cl.
*F03D 1/06* (2006.01)
*B29C 70/52* (2006.01)
(Continued)

(52) U.S. Cl.
CPC .......... *F03D 1/0675* (2013.01); *B29C 70/521* (2013.01); *B29C 70/525* (2013.01);
(Continued)

(58) Field of Classification Search
CPC .. F03D 1/0633; F03D 1/0675; F05B 2240/99; B29L 2031/085; B29C 70/521;
(Continued)

(56) References Cited

U.S. PATENT DOCUMENTS 11,035,339 B2 *   6/2021   Roberts ............. B29C 66/12461
11,041,478 B2 *   6/2021   Monie ................... B29C 66/524
(Continued)

FOREIGN PATENT DOCUMENTS

EP      2341239 A2    7/2011
EP      3026260 A1    6/2016
(Continued)

OTHER PUBLICATIONS

Danish Patent and Trademark Office, Search and Examination Report in PA 2017 70850, dated Mar. 28, 2018.
(Continued)

*Primary Examiner* — Courtney D Heinle
*Assistant Examiner* — Sang K Kim
(74) *Attorney, Agent, or Firm* — Wood Herron & Evans LLP; Steven W. Benintendi

(57) ABSTRACT

A wind turbine blade having a spar cap and a shear web system is described. The spar cap comprises a pultruded strip of fibrous reinforcing material with a first datum feature visible at a surface of the pultruded strip. The shear web system comprises a second datum feature, wherein the first datum feature of the spar cap is aligned with the second datum feature of the shear web system.

20 Claims, 9 Drawing Sheets

(51) Int. Cl.
    *B29K 307/04* (2006.01)
    *B29K 309/08* (2006.01)
    *B29L 31/08* (2006.01)
(52) U.S. Cl.
    CPC ...... *B29K 2307/04* (2013.01); *B29K 2309/08* (2013.01); *B29K 2995/0021* (2013.01); *B29L 2031/085* (2013.01)
(58) Field of Classification Search
    CPC .............. B29C 70/525; B29K 2307/04; B29K 2309/08; B29K 2995/0021
    See application file for complete search history.

(56) References Cited

U.S. PATENT DOCUMENTS

| | | | |
|---|---|---|---|
| 2011/0008175 A1* | 1/2011 | Gau | F03D 1/0675 416/233 |
| 2012/0027609 A1* | 2/2012 | Ogde | B29C 70/545 29/889.71 |
| 2012/0027612 A1* | 2/2012 | Yarbrough | F03D 1/0683 416/226 |
| 2014/0271217 A1 | 9/2014 | Baker | |
| 2014/0369849 A1* | 12/2014 | Flach | B29C 70/68 264/511 |
| 2015/0316023 A1* | 11/2015 | Sandercock | F03D 1/0675 29/799 |
| 2016/0263844 A1 | 9/2016 | Smith | |
| 2017/0058866 A1 | 3/2017 | Caruso et al. | |
| 2017/0074241 A1 | 3/2017 | Koike | |
| 2018/0216602 A1* | 8/2018 | Bech | F16F 1/3732 |
| 2018/0328335 A1* | 11/2018 | Smith | F03D 1/065 |

FOREIGN PATENT DOCUMENTS

| | | |
|---|---|---|
| WO | 2015197076 A1 | 12/2015 |
| WO | 2017088890 A1 | 6/2017 |

OTHER PUBLICATIONS

European Patent Office, International Search Report and Written Opinion in PCT Application Serial No. PCT/DK2018/050286, dated Feb. 20, 2019.

* cited by examiner

WIND TURBINE BLADE MANUFACTURE

TECHNICAL FIELD

The present invention relates generally to wind turbine blades and to improved methods of manufacturing wind turbine blades.

BACKGROUND

The blades of modern utility-scale wind turbines typically comprise a hollow shell made from two half-shells bonded together along leading and trailing edges of the blade. The half shells are typically formed from composite materials such as glass-fibre reinforced plastic (GFRP) and have a laminate structure. Such blades generally include a reinforcing spar structure comprising spar caps and a shear web. The spar caps may be formed of pultruded strips of composite material, typically carbon-fibre reinforced plastic (CFRP). The strips may be arranged in a stack and embedded within the laminate structure of the shell.

A shear web may comprise a web panel disposed between upper and lower mounting flanges. The mounting flanges may be bonded between opposed inner surfaces of the half shells in alignment with the spar caps. The accurate alignment of shear webs with spar caps is critical for ensuring that the spar structure provides structural support in conformance with the design specification of the blade.

It is common to use an assembly jig to support the shear web relative to the blade shells when bonding the shear web to a half shell. Such jigs ensure accurate alignment of the shear web, but have a number of disadvantages. For example, the jig may be expensive to produce and is typically bespoke for a single blade design, meaning that for further design changes and development, reconfiguration of the jig may be necessary or a new jig may be required at significant cost. Such jigs are also large and complex assemblies, which may be difficult and time-consuming to install and configure, and take up significant space in the factory.

It is therefore desirable to design new manufacturing processes that avoid the necessity for such assembly jigs. However, in the absence of a jig it can be difficult to ensure accurate alignment of the shear web(s). Against this background, the present invention has been developed.

SUMMARY OF THE INVENTION

According to a first aspect of the present invention there is provided a wind turbine blade having a spar cap and a shear web system, the spar cap comprising a pultruded strip of fibrous reinforcing material and a first datum feature visible at a surface of the pultruded strip; and the shear web system comprising a second datum feature wherein the first datum feature of the spar cap is aligned with the second datum feature of the shear web system.

The first datum feature may comprise fibres or another material integral with the pultruded strip. The fibres or other material forming the first datum feature are preferably of a contrasting colour to the bulk of the pultruded strip.

The shear web system may comprise a web locating device attached to an inner surface of the wind turbine blade. The second datum feature may be part of the web locating device. For example the second datum feature may be integrally formed with or otherwise provided on the web locating device. The second datum feature may comprise one or more marks or protruding features on a base of the web locating device. Preferably, the second datum feature comprises a ridge. Alternatively, the second datum feature may be part of the shear web.

The pultruded strip may have a thickness, a width and a length; the width being greater than the thickness, and the length being greater than the width. The first datum feature is preferably substantially central with respect to the width of the pultruded strip. The length of the pultruded strip is parallel to a spanwise direction of the blade. The width of the strip is parallel to a chordwise direction of the blade.

The spar cap is preferably formed from a stack of pultruded strips. The first datum feature is preferably created in a pultrusion process to form the pultruded strip. For example, additional fibres or other material of contrasting colour to the bulk may be passed through the pultrusion die with the bulk fibres. Alternatively, the first datum feature may be formed by marking a surface of the pultruded strip. The surface of the pultrusion may be marked as part of the pultrusion process used to form the pultruded strip. Marking may comprise applying a marking substance such as paint, ink, crayon etc. to the surface, or forming indentations on the surface, for example scoring the surface.

The pultruded strips may comprise a plurality of first datum features visible at the surface of the strip. The or each first datum feature is located inwardly of the longitudinal edge of the strip. Preferably the or each first datum feature is substantially central relative to the width of the strip.

According to a further aspect of the present invention there is provided a method of making a wind turbine blade. The method comprises: providing a blade shell assembly including a spar cap comprising a pultruded strip of fibrous reinforcing material and a first datum feature visible at a surface of the pultruded strip; providing a shear web system comprising a second datum feature, aligning the second datum feature of the shear web system with the first datum feature of the spar cap such that the shear web system is located in a required position relative to the blade shell assembly; and attaching the shear web system to the blade shell assembly in the required position.

In said method the shear web system may comprise a web locating device and the second datum feature may be part of the web locating device. The step of attaching the shear web system to the blade shell assembly may comprise attaching the web locating device to an inner surface of the blade shell assembly.

The shear web system may comprise a plurality of web locating devices attached to an inner surface of the wind turbine blade. Each web locating device may comprise a respective second datum feature.

The shear web system preferably comprises a shear web. The method may comprise locating the shear web within the web locating device and attaching the shear web to the inner surface of the blade shell assembly. The web locating devices are not essential. In an alternative arrangement, the method may comprise aligning the shear web directly with the one or more first datum features of the spar cap. In such examples, the one or more second datum features may be part of the shear web. For example, the one or more second datum features may be part of or provided on a mounting flange of the shear web.

The second datum features may be the upstand of a web foot, for example the upstand of a T-shaped web foot.

According to a further aspect of the present invention there is provided a pultrusion process for making a pultruded strip of fibre reinforcing material for a wind turbine blade spar cap.

The process comprises passing resin-coated reinforcing fibres through a pultrusion die having a cross-sectional shape corresponding to a required cross-sectional shape of the pultruded strip, and forming a datum feature on the pultruded strip as part of the pultrusion process, the datum feature being visible at a surface of the pultruded strip.

The pultrusion process may comprise passing additional material through the pultrusion die to form the datum feature, wherein the additional material is visible at the surface of the pultruded strip. The additional material may comprise fibres or another material of a contrasting colour to the bulk of the pultruded strip. The pultrusion process may comprise forming the datum feature by marking a surface of the pultruded strip within a pultrusion die or downstream of a pultrusion die.

BRIEF DESCRIPTION OF THE DRAWINGS

The present invention and further relevant background will now be described by way of non-limiting examples, with reference to the accompanying figures in which.

DETAILED DESCRIPTION

Figure 1:
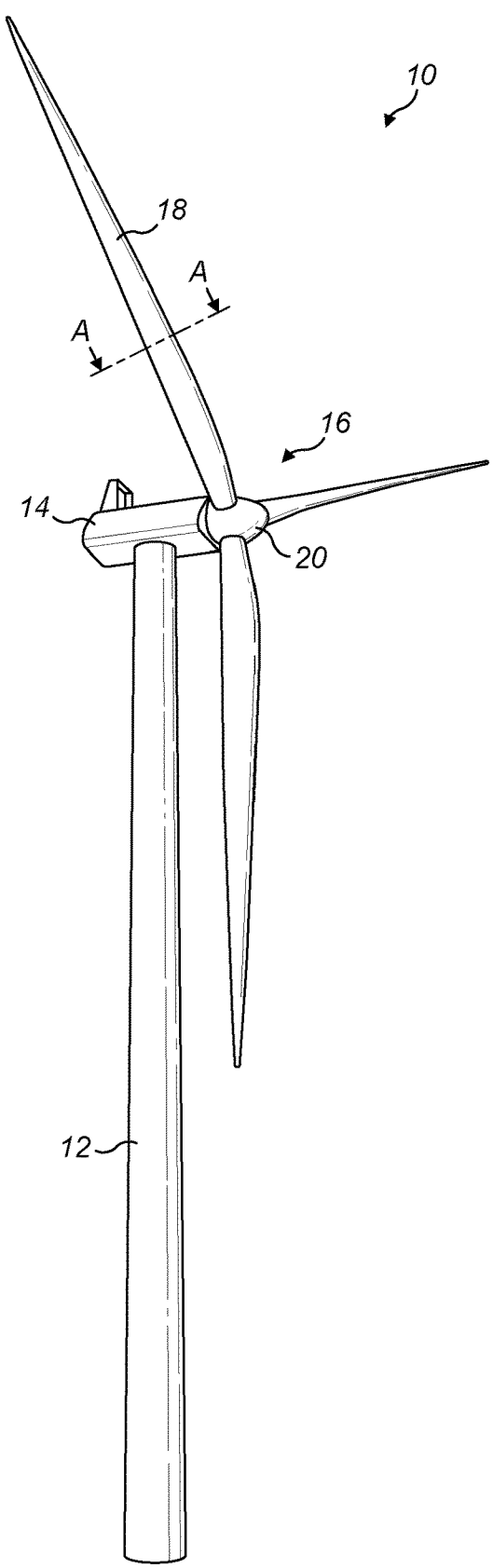
FIG. 1 shows an example of a wind turbine in accordance with an embodiment of the invention.

FIG. 1 shows an example of a wind turbine 10 in accordance with an embodiment of the present invention. The wind turbine 10 comprises a tower 12 supporting a nacelle 14 at its upper end. A rotor 16 is mounted to the nacelle 14. The rotor 16 comprises three rotor blades 18, which are attached to and extend radially from a central hub 20.

Figure 2:
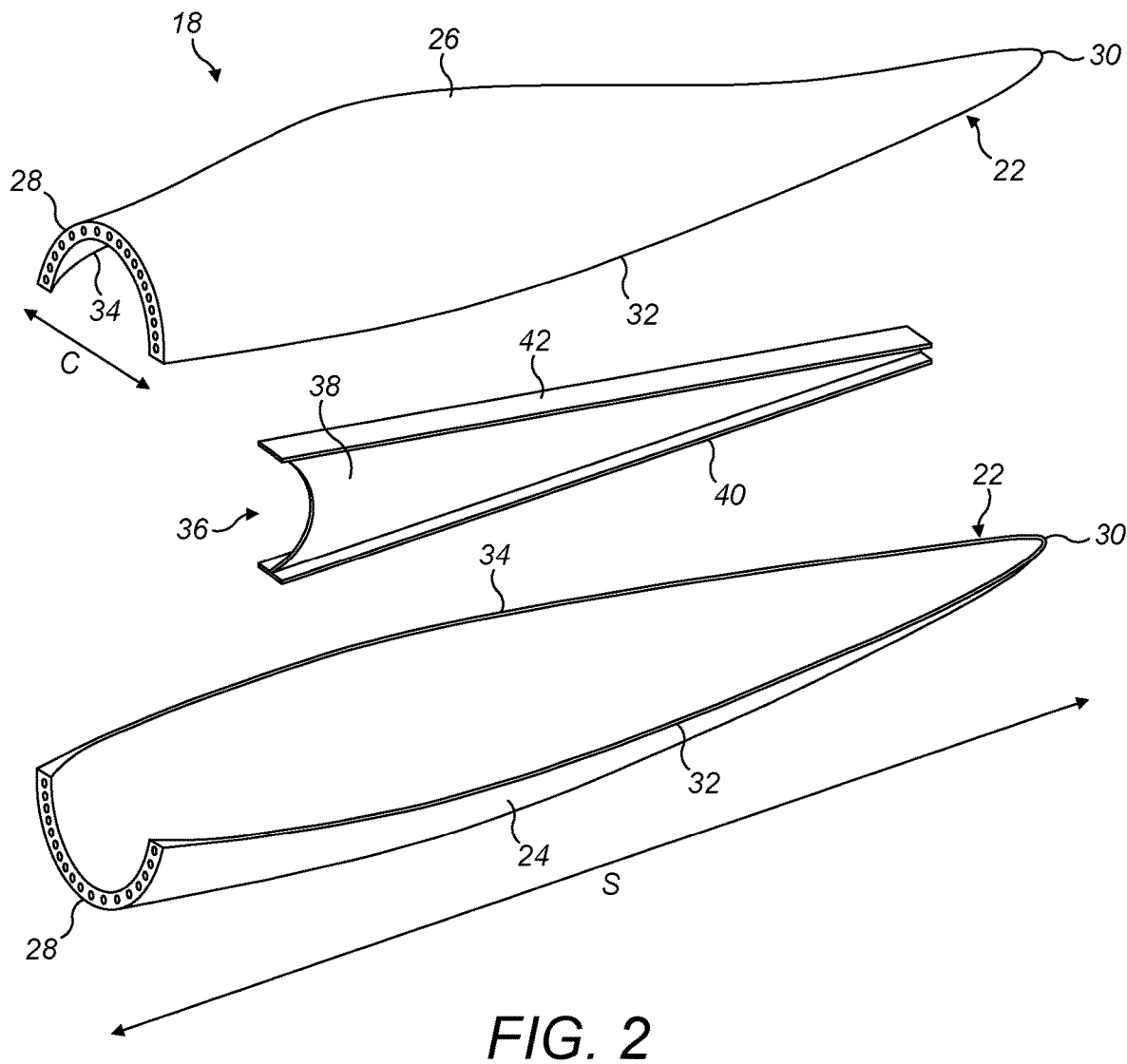
FIG. 2 is an exploded view of a wind turbine blade comprising first and second half shells and a shear web.

FIG. 2 is an exploded view of a wind turbine blade 18. The blade 18 comprises an outer shell 22 formed of first and second half shells 24, 26, e.g. a windward half shell 24 and a leeward half shell 26 that are united to form the complete shell. The half shells 24, 26 each extend from a root end 28 to a tip end 30 in a spanwise direction, S, and extend between a leading edge 32 and a trailing edge 34 in a chordwise direction, C.

The blade 18 includes a longitudinally-extending shear web 36, which in the illustrated example comprises a web panel 38 disposed between first and second mounting flanges 40, 42. In the orientation of the shear web 36 shown in the figure, the first mounting flange 40 is a 'lower' mounting flange, and the second mounting flange 42 is an 'upper' mounting flange. The mounting flanges 40, 42 are arranged transversely to the web-panel 38.

Figure 3:
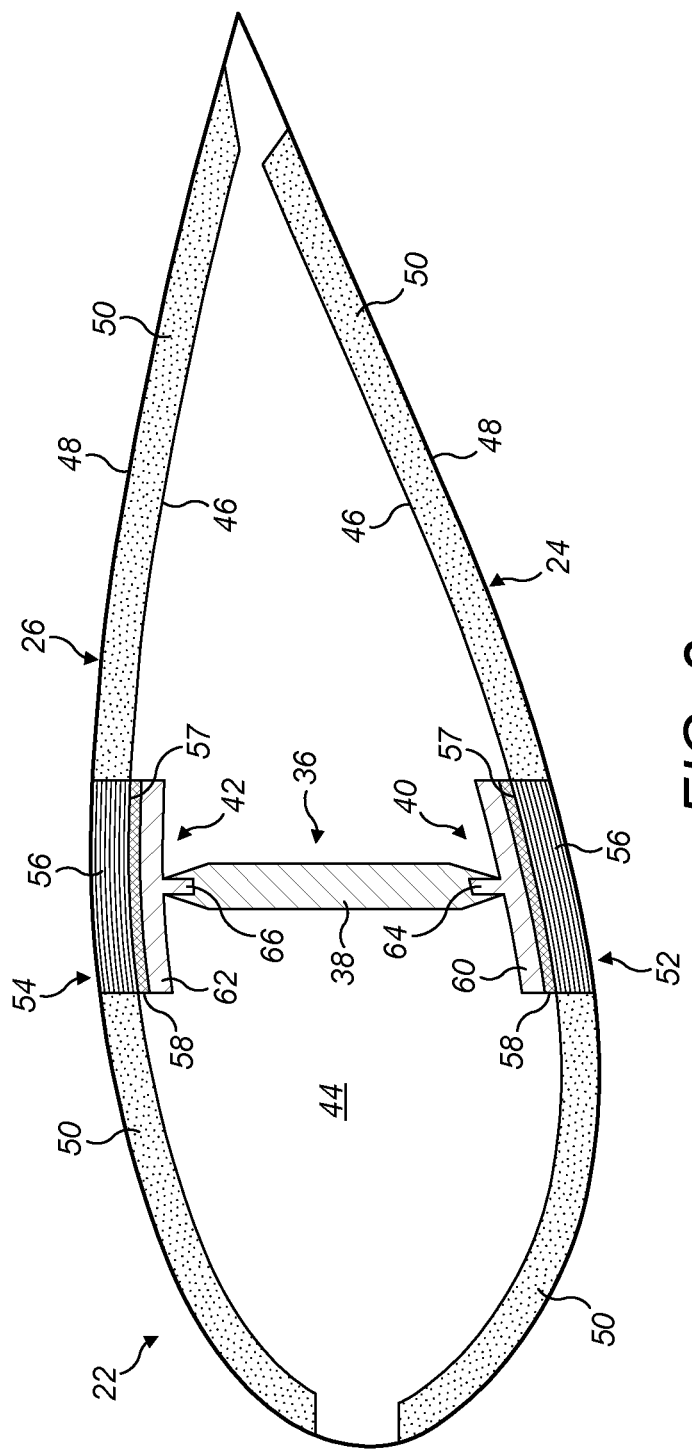
FIG. 3 is a schematic cross-sectional view of the wind turbine blade taken through the line A-A in FIG. 1 including spar caps embedded in the laminate shell.

FIG. 3 is a schematic cross-sectional view through the blade 18 in a chordwise plane taken along the line A-A in FIG. 1. Referring to FIG. 3, the outer shell 22 of the blade has a laminate composite structure and defines a substantially hollow interior region 44. More specifically, in this example the outer shell 22 comprises inner and outer skins 46, 48 made primarily from glass-fibre reinforced plastic (GFRP). In certain regions of the shell 22, a core 50 of lightweight foam (e.g. polyurethane) is provided between the skins 46, 48.

As shown in FIG. 3, the blade includes first and second spar caps 52, 54 associated respectively with the windward and leeward half shells 24, 26. In this example, the spar caps are embedded within the laminate structures of the respective half shells 24, 26. The spar caps 52, 54 are in mutually-opposed relation. Each spar cap 52, 54 has a substantially rectangular cross section and is made up of a stack of pre-fabricated reinforcing strips 56. The strips 56 are pultruded strips preferably formed of carbon-fibre reinforced plastic (CFRP), and are substantially flat and of rectangular cross section.

The shear web 36 is located inside the hollow interior region 44 of the blade and extends between the spar caps 52, 54. The mounting flanges 40, 42, of the shear web 36 are bonded to an inner surface 57 of the blade shell by means of adhesive 58. In this example, the mounting flanges 40, 42 are defined by web feet 60, 62 that are T-shaped in cross-section. These T-shaped web feet 60, 62 may be formed by pultrusion. As shown, the upstands 64, 66 of the T-shaped web feet 60, 62 are integrated with the shear web panel 38.

As already described by way of background, it is important to ensure that the shear webs 36 are correctly positioned relative to the blade shells 24, 26 and accurately aligned with the spar caps 52, 54. A technique for positioning the shear webs 36 will now be described with reference to FIG. 4.

Figure 4:
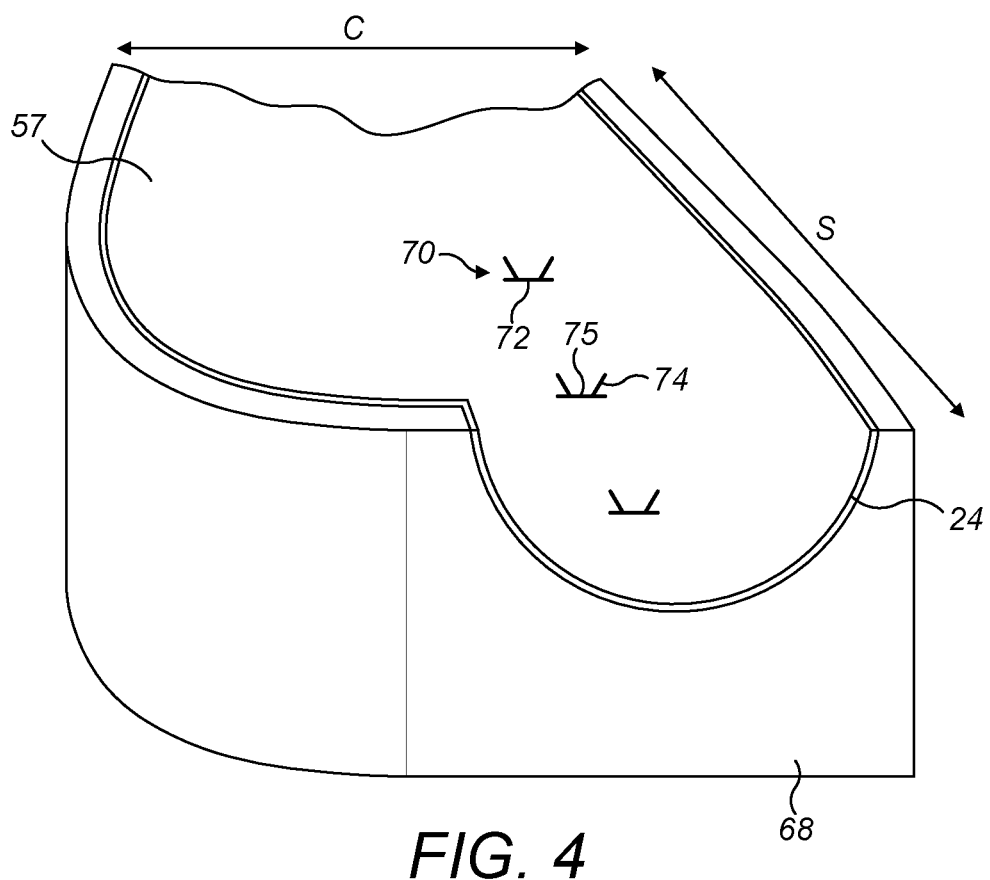
FIG. 4 illustrates a half shell of the wind turbine blade supported in a half mould with a plurality of web locating devices attached to an inner surface of the half shell.

FIG. 4 shows a wind turbine blade half mould 68 supporting a half shell 24. To facilitate positioning a shear web 36 relative to a blade half shell 24, a plurality of web locating devices 70 may be attached to an inner surface 57 of the half shell 24. The web locating devices 70 are spaced at intervals along the inner surface 57 of the half shell 24. The web locating devices 70 receive the shear web 36 and guide the shear web 36 into the required position on the inner surface 57 of the blade 18. The web locating devices 70 each comprise a substantially flat base 72 for attaching to the inner surface 57 of the half shell 24. A pair of upstands 74 extend upwardly from the base 72 and define an aperture 75 therebetween to receive the shear web 36. The web locating devices 70 are described in further detail in applicant's co-pending patent application WO2017/088890.

The web locating devices 70 must be accurately positioned relative to the spar caps 52, 54 in order to ensure that the shear web 36 is guided into the correct position. One technique for positioning the web locating devices 70, which is not part of the present invention, involves the use of a laser projection system. The laser projection system projects the mounting locations for the web locating devices on the inner surface 57 of the blade shell 24 based upon a CAD model. However, as will now be described with reference to FIG. 5, the use of a laser projection system may introduce unacceptable inaccuracies into the shear web alignment process.

Figure 5:
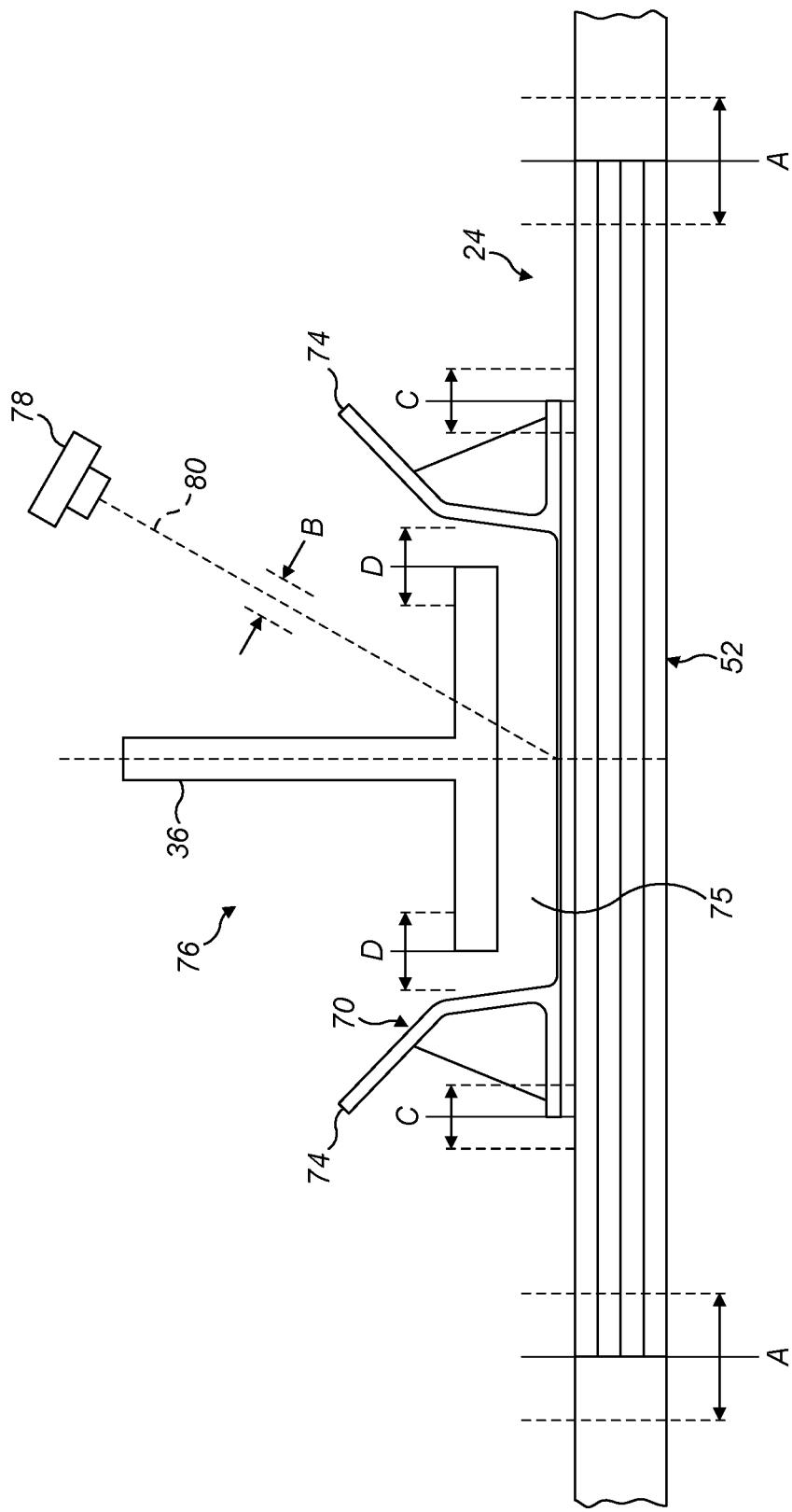
FIG. 5 is a schematic sectional view illustrating a technique for aligning a shear web system using a laser, which is not part of the present invention.

FIG. 5 is a schematic cross-sectional view through a portion of a half shell 24 comprising a spar cap 52. A shear web system 76 for aligning with the spar cap 52 is also shown. The shear web system 76 comprises a shear web 36 and a web locating device 70. A laser-projection system 78 is located above the half shell 24. The laser projection system 78 projects the mounting position for the web locating device 70 on the blade shell 24. As mentioned above, the mounting position is based upon a CAD model of the blade shell 24. However, this does not take into account the actual position of the spar cap 52, which may vary from the CAD model within a certain tolerance (e.g. ±5 mm) due to the manual layup processes used to form the half shells 24, 26. This spar cap tolerance is indicated by the double-headed arrows A in FIG. 5.

The laser itself is only accurate to within a certain tolerance B (e.g. ±2 mm). In addition, the manual process of attaching the web locating devices 70 to the half shell 24 may introduce further inaccuracies into the process; for example, the web locating devices 70 may be aligned to the laser projection 80 to within a certain tolerance C (e.g. ±2 mm).

The apertures 75 of the web locating devices 70 must be made sufficiently wide to accommodate the tolerances B and C in order to avoid the possibility of the shear web 36 clashing with the upstands 74 of the web locating devices 70 in a 'worst case' scenario.

Accordingly, the width of the apertures 75 must be oversized in comparison to the width of the mounting flange 40 of the shear web 36. In this example, the chordwise width of the apertures 75 is oversized by approximately 10 mm to provide a tolerance D of +/−5 mm. However, the oversized apertures 75 introduce an additional source of error in the alignment process as the shear web 36 may sit anywhere within an aperture 75.

The accurate alignment of the shear web system 76 with the spar cap 52 therefore relies on the accuracy A of the position of the spar caps 52 in the half-shell 24, the accuracy B of the laser-projection 80, the accuracy C of the operator in attaching the web locating devices 70, and the accuracy D of the shear web 36 position within the apertures of the web locating devices 70. The maximum error in the shear web position relative to the spar cap 52 is therefore the sum of these tolerances (i.e. A+B+C+D). However, this maximum error may exceed the design tolerance for the shear web position. In this example, the maximum error is ±14 mm, whilst the maximum tolerance for the position is ±10 mm.

A more accurate technique for aligning the shear web system 76 in accordance with an example of the present invention will now be described with reference to FIGS. 6 and 7.

Figure 6:
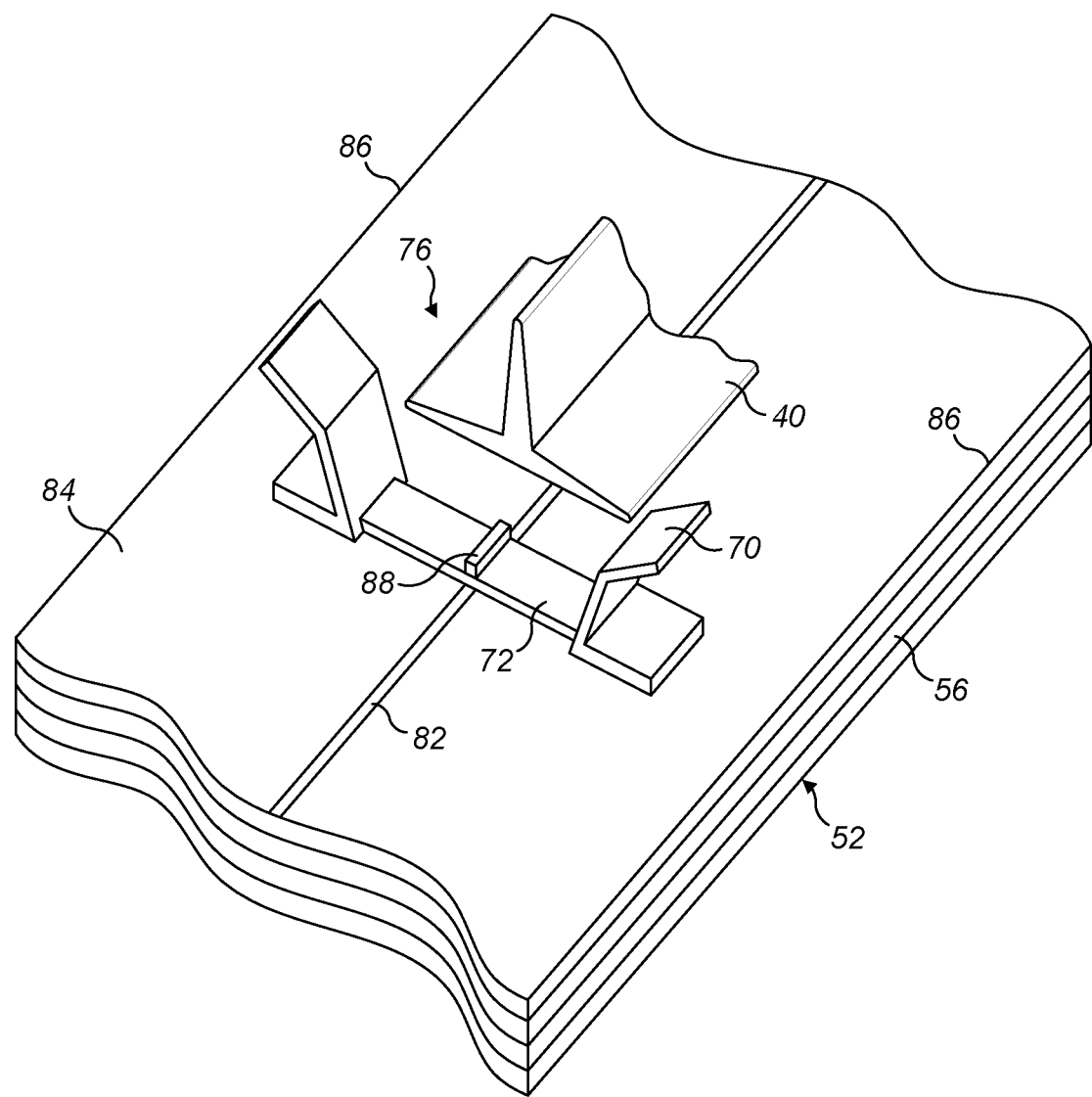
FIG. 6 is a schematic perspective view showing a web locating device aligned with a spar cap in preparation for receiving a shear web.

FIG. 6 is a schematic perspective view showing a shear web system 76 being aligned with a spar cap 52 according to an example of the present invention. The shear web system 76 comprises a shear web 36 and a web locating device 70. Only the foot of the shear web 36, which comprises the mounting flange 40, is shown in FIG. 6. The spar cap 52 is formed from a plurality of pultruded strips 56 of reinforcing material arranged in a stack. In this example, the strips 56 are formed of CFRP. In practice, the spar cap 52 may be integrated within the structure of a half shell 24, as described previously, although for clarity other components of the half shell 24 have been omitted from FIG. 6.

In accordance with the present invention, the spar cap 52 in this embodiment includes a first datum feature 82. The first datum feature 82 is visible at the surface 84 of the spar cap. In particular, the first datum feature 82 is visible at the upper surface 84 of the uppermost pultruded strip 56 in the stack. In this example the first datum feature 82 is located along the centreline of the pultrusion. In other examples the first datum feature 82 may be provided at any other point across the width of the pultruded strip 56 inwardly of the edges 86 of the strip.

The shear web system 76 in this example includes a second datum feature 88. The second datum feature 88 in this example is part of the web locating device 70. As shown, the second datum feature 88 is provided substantially at the centre of the base 72. In other examples, the second datum feature 88 could be provided at any other suitable location on the web locating device 70 depending upon the location of the first datum feature 82. The second datum feature 88 in this example comprises a ridge that protrudes from the base 72 of the web locating device 70. Advantageously the second datum feature 88 on the web locating device 70 extends in a spanwise direction across the base 72.

In order to align the shear web system 76 with the spar cap 52, the web locating devices 70 are positioned on the inner surface 57 of the half shell 24 with their respective second datum features 88 aligned with the first datum feature 82 of the spar cap 52. Aligning both ends of the ridge with the first datum feature 82 of the spar cap 52 advantageously ensures the web locating device 70 is rotationally aligned with the spar cap 52. The web locating devices 70 are then attached, e.g. bonded, to the surface 57. Adhesive (not shown) is applied on top of the spar cap 52 and within the apertures 75 of the web locating devices 70. The shear web 36 is then inserted into the apertures 75 of the web locating devices 70.

The provision of visible datum features 82, 88 on the spar caps 52, 54 and shear web system 76 allow the shear web system 76 to be aligned directly with the spar caps 52, 54. This technique advantageously avoids the need for a laser projection system. As will now be described with reference to FIG. 7, this technique significantly increases the accuracy with which the shear webs 36 can be aligned with the spar caps 52, 54 in comparison to the technique described above with reference to FIG. 5.

Figure 7:
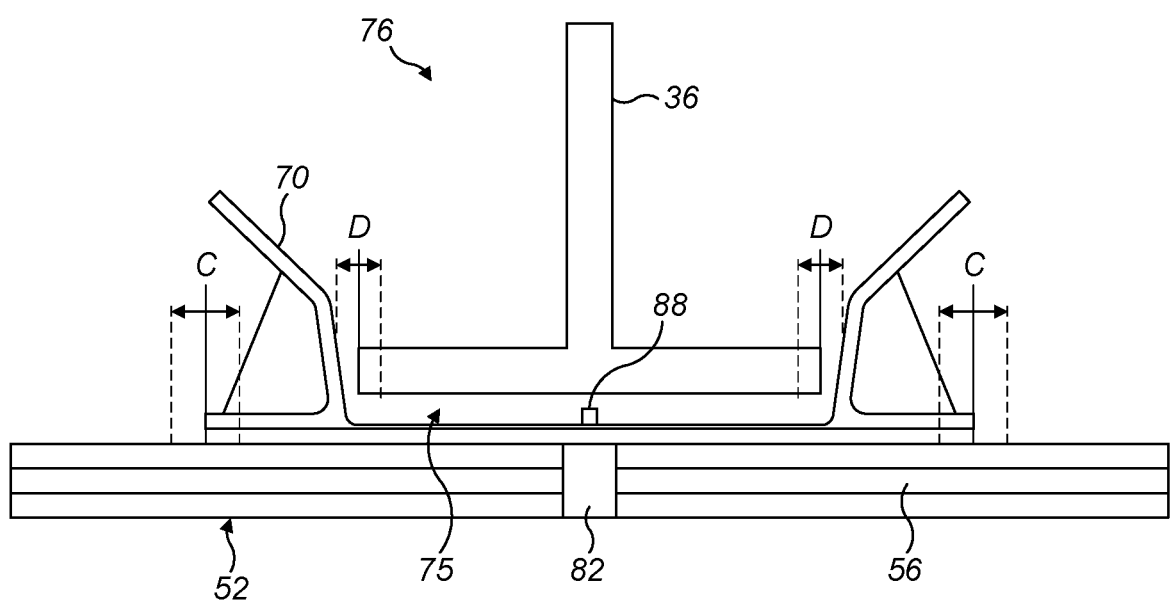
FIG. 7 is a schematic sectional view illustrating a technique for aligning a shear web system in accordance with an example of the present invention, in which datum features are provided on the spar cap and on a web locating device of the shear web system.

FIG. 7 is a schematic cross-sectional view of the arrangement shown in FIG. 6. As the web locating devices 70 are aligned directly with the spar cap 52 (instead of being aligned to a CAD model that does not factor in the actual position of the spar cap), the accurate alignment of the shear web 36 with the spar cap 52 is unaffected by any inaccuracies in the spar cap position. The tolerance denoted 'A' in FIG. 5 (e.g. +1-5 mm) therefore does not affect the accuracy in this method. As the laser is omitted, the tolerance associated with the laser denoted 'B' in FIG. 5 is also not a relevant factor.

Instead, the accurate alignment of the shear web 36 with the spar cap 52 in this example is affected primarily by the accuracy C in the position of the web locating devices 70, and the accuracy D of the shear web position within the apertures 75 of the web locating devices 70. As with the example of FIG. 5, the accuracy C may be +1-2 mm to allow for operator error in a manual process of aligning and attaching the web locating devices 70. To avoid the possibility of a clash condition, the apertures 75 of the web locating devices 70 are slightly oversized to accommodate the tolerance C. In this example, the apertures are oversized by 5 mm, which is sufficient to accommodate variations in the relative positions of the web locators 70 of +1-2.5 mm. Advantageously, the apertures 75 of the web locating devices 70 may be made significantly smaller than in the example of FIG. 5 since there are fewer tolerances that need to be accommodated by the web locating devices 70 when the shear web system 76 is aligned directly with the spar cap 52.

The maximum error in the shear web position relative to the spar cap 52 in this example is therefore +/−4.5 mm (i.e. C+D). This is well within the maximum tolerance for the position of +/−10 mm, and significantly lower than the maximum error of +/−14 mm associated with the laser-alignment method described in relation to FIG. 5. Therefore, the present invention provides a more accurate technique for aligning the shear webs 36 with the spar caps 52, 54 and avoids the need for a laser alignment system 78 and the associated costs of such a system.

Advantageously, the first datum feature 82 may be created during a pultrusion process used to form the pultruded strips 56. An example of this will now be described with reference to FIG. 8.

Figure 8:
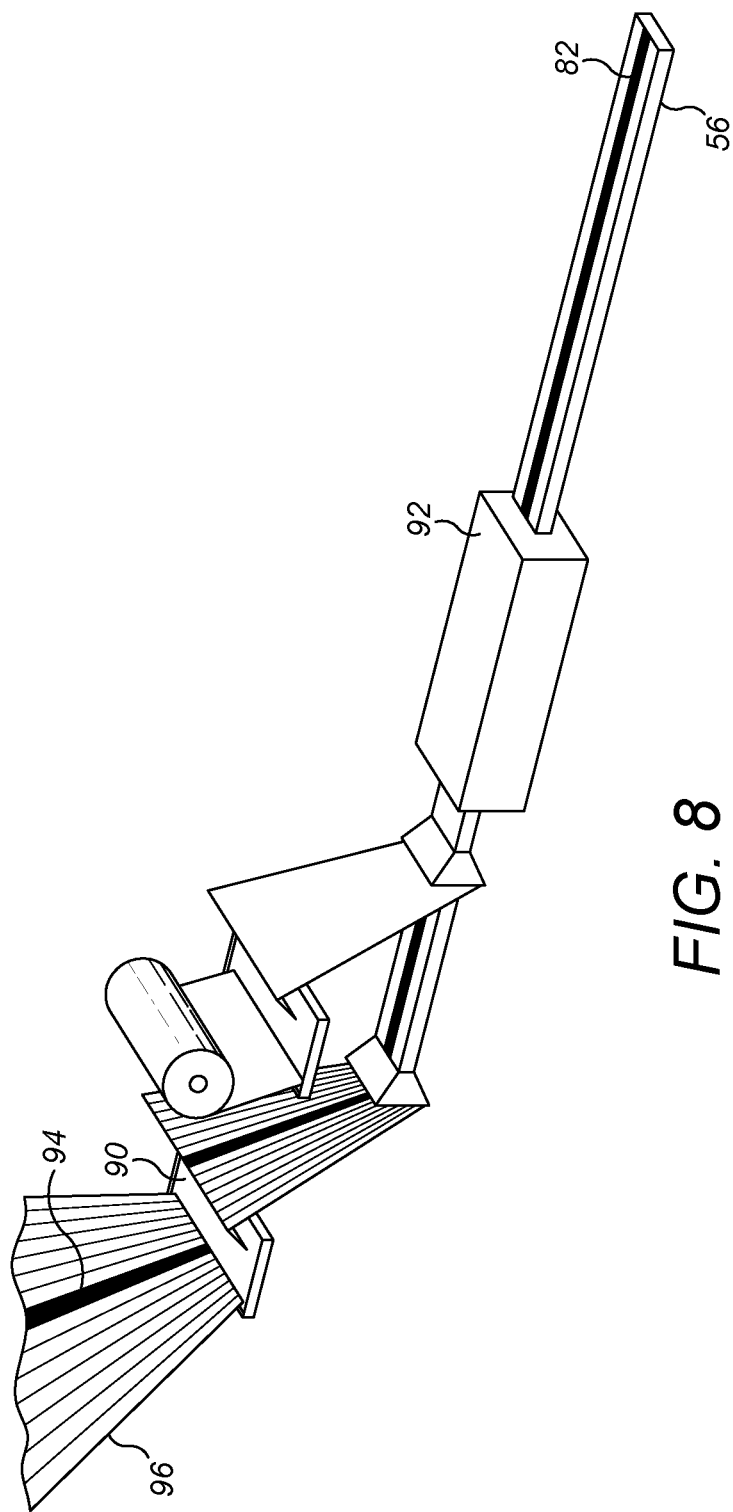
FIG. 8 illustrates a pultrusion process according to an example of the present invention, in which contrasting material is incorporated in the pultruded strip during the pultrusion process to form a datum feature.

FIG. 8 shows a pultrusion process by which the pultruded strips 56 of the spar cap 52 may be formed. Pultrusion is a continuous process similar to extrusion, in which fibres are pulled through a supply of liquid resin 90 and through one or more dies 92, which shape the strip 56. The resin is then cured, for example by heating in an open chamber or by employing heated dies that cure the resin as the strip 56 is shaped.

In accordance with an embodiment of the invention, the first datum feature 82 may be formed by feeding additional material through the pultrusion die. In this example, a fibre roving 94 having a contrasting colour to the bulk fibres 96 of the strip is fed through the die together with the bulk fibres 96. The bulk fibres 96 may be carbon fibres, which are black in colour. The additional fibres 94 may be lighter in colour than the carbon fibres, for example white, yellow etc. The additional fibres 94 may be carbon fibres that have been coated or they may be other fibres. The contrasting fibres 94 are incorporated within the structure of the pultruded strip 56 and form a first datum feature 82 that is visible at the surface 84 of the strip. This automated manufacturing process makes it possible to achieve a high level of accuracy and repeatability when forming the first datum feature 82. Advantageously, relatively little modification is required to the pultrusion process, so pultrusions with integrated datum features may be produced without significant additional cost.

Instead of incorporating additional material in the structure of the pultrusions, the first datum features 82 may be provided in other ways, examples of which will now be described with reference to FIG. 9.

Figure 9:
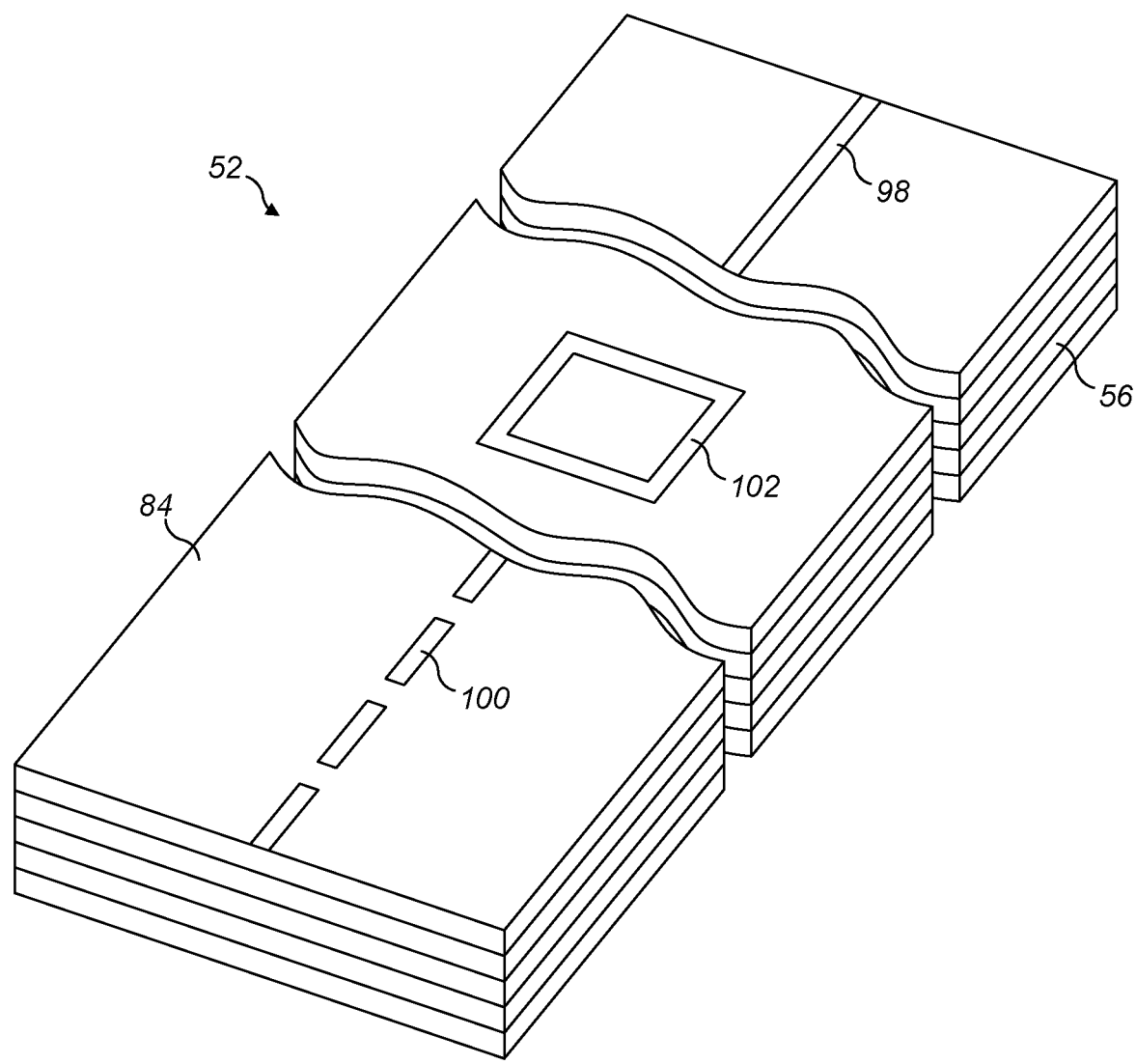
FIG. 9 shows a stack of pultruded strips forming a spar cap, and illustrates various examples of datum features visible on the surface of the pultruded strips.

FIG. 9 shows a spar cap 52 comprising a stack of pultruded strips 56. In these examples, the first datum feature 82 is provided by marking a surface 84 of a pultrusion 56. The markings may be made by applying a marking substance to the surface 84 of the pultrusion 56, e.g. using pen, paint, chalk, crayon etc. Alternatively, the markings may be made by removing material from the surface 84, e.g. by scoring the surface 84. Markings may include but are not limited to the following; a continuous line 98, a broken (dashed) line 100, or a geometric shape 102.

The markings shown by way of example in FIG. 9 may advantageously be created during the pultrusion process. For example, a marking device may be provided inline with the pultrusion apparatus and arranged to mark the surface 84 of the pultruded strip 56 either inside the pultrusion die 92 or after the strip 56 emerges from the pultrusion die 92.

Many modifications may be made to the examples described above without departing from the scope of the present invention as defined in the accompanying claims.

For example, in other embodiments the web locating devices may be omitted and the second datum features may be part of the shear web itself. For example, the second datum feature may be provided on the mounting flange of the shear web or it could be defined by the upstand of the T-shaped web foot. Whilst the spar caps in the above examples are embedded in the shell structure of the blade, in other examples the spar caps may be otherwise integrated with half shells, for example the spar caps may be bonded to the inner surface of the blade.

The invention claimed is:

1. A wind turbine blade having a spar cap and a shear web system,
   the spar cap comprising a pultruded strip of fibrous reinforcing material and a first datum feature incorporated within the pultruded strip and visible at a surface of the pultruded strip; and
   the shear web system comprising a second datum feature,
   wherein the first datum feature of the spar cap is aligned with the second datum feature of the shear web system, and
   wherein the first datum feature comprises fibres or another material integral with the pultruded strip, wherein the fibres or other material forming the first datum feature are of a contrasting colour to the bulk of the pultruded strip.

2. The wind turbine blade of claim 1, wherein the shear web system comprises a web locating device attached to an inner surface of the wind turbine blade, and wherein the second datum feature is part of the web locating device.

3. The wind turbine blade of claim 2, wherein the second datum feature comprises one or more marks or protruding features on a base of the web locating device.

4. The wind turbine blade of claim 1, wherein the pultruded strip has a thickness, a width and a length, the width being greater than the thickness, and the length being greater than the width, and wherein the first datum feature is central with respect to the width of the pultruded strip.

5. The wind turbine blade of claim 1, wherein the spar cap is formed from a stack of pultruded strips.

6. The wind turbine blade of claim 1, wherein the first datum feature is created in a pultrusion process to form the pultruded strip.

7. The wind turbine blade of claim 1, wherein the first datum feature is formed by marking a surface of the pultruded strip as part of a pultrusion process used to form the pultruded strip.

8. The wind turbine blade of claim 2, wherein a base surface of the web locating device overlays the first datum feature and the surface of the pultruded strip.

9. The wind turbine blade of claim 2, wherein a base surface of the web locating device is positioned between the first datum feature and the second datum feature.

10. The wind turbine blade of claim 2, wherein the first datum feature is spaced away from the second data feature.

11. A method of making a wind turbine blade, the method comprising:
    providing a blade shell assembly including a spar cap comprising a pultruded strip of fibrous reinforcing material and a first datum feature incorporated within the pultruded strip and visible at a surface of the pultruded strip, wherein the first datum feature comprises fibres or another material integral with the pultruded strip, and wherein the fibres or other material forming the first datum feature are of a contrasting colour to the bulk of the pultruded strip;

providing a shear web system comprising a second datum feature, aligning the second datum feature of the shear web system with the first datum feature of the spar cap such that the shear web system is located in a required position relative to the blade shell assembly; and attaching the shear web system to the blade shell assembly in the required position.

12. The method of claim 11, wherein the shear web system comprises a web locating device and the second datum feature is part of the web locating device, and wherein the step of attaching the shear web system to the blade shell assembly comprises attaching the web locating device to an inner surface of the blade shell assembly.

13. The method of claim 12, wherein the shear web system comprises a shear web and the method comprises locating the shear web within the web locating device and attaching the shear web to the inner surface of the blade shell assembly.

14. The method of claim 13, wherein locating the shear web within the web locating device comprises locating a mounting flange of the shear web within the web locating device.

15. A wind turbine blade having a spar cap and a shear web system, the spar cap comprising a pultruded strip of fibrous reinforcing material and a first datum feature visible at a surface of the pultruded strip, wherein the first datum feature comprises fibres or another material integral with the pultruded strip, wherein the fibres or other material forming the first datum feature are of a contrasting colour to the bulk of the pultruded strip; and the shear web system, comprising:

a web locating device including a second datum feature; and a shear web configured to be attached to an inner surface of the wind turbine blade with the web locating device;

wherein the first datum feature of the spar cap is aligned with the second datum feature of the shear web system.

16. The wind turbine blade of claim 15, wherein a base surface of the web locating device overlays the first datum feature and the surface of the pultruded strip.

17. The wind turbine blade of claim 15, wherein a base surface of the web locating device is positioned between the first datum feature and the second datum feature.

18. The wind turbine blade of claim 15, wherein the first datum feature is spaced away from the second datum feature.

19. A wind turbine blade having a spar cap and a shear web system, the spar cap comprising a pultruded strip of fibrous reinforcing material that is flat and of rectangular cross section and a first datum feature incorporated within the pultruded strip, the first datum feature being distinguishable in appearance from the fibrous reinforcing material of the pultruded strip so as to be visible at a surface of the pultruded strip; and the shear web system comprising a second datum feature, wherein the first datum feature comprises fibres or another material integral with the pultruded strip, wherein the fibres or other material forming the first datum feature are of a contrasting colour to the bulk of the pultruded strip, and wherein the first datum feature of the spar cap is aligned with the second datum feature of the shear web system.

20. The wind turbine blade of claim 19, wherein the pultruded strip is flat and of rectangular cross section in a region where the first datum feature is located.

* * * * *